US006873852B2

(12) United States Patent
Koorapaty et al.

(10) Patent No.: US 6,873,852 B2
(45) Date of Patent: Mar. 29, 2005

(54) SYSTEM AND METHOD OF ESTIMATING THE POSITION OF A MOBILE TERMINAL IN A RADIO TELECOMMUNICATIONS NETWORK

(75) Inventors: Havish Koorapaty, Cary, NC (US); Wade Wang, Plano, TX (US); Viswanath Panakanti, Dallas, TX (US); Guwei Zhu, Plano, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 625 days.

(21) Appl. No.: 10/044,230

(22) Filed: Jan. 10, 2002

(65) Prior Publication Data

US 2003/0129992 A1 Jul. 10, 2003

(51) Int. Cl.[7] ................................................ H04Q 7/20
(52) U.S. Cl. ................ 455/458; 455/456.1; 455/456.2; 455/456.5; 455/456.6; 455/423; 455/67.11; 455/67.14; 455/436; 455/437; 455/439; 342/457; 342/464; 342/450
(58) Field of Search ........................... 455/456.1, 456.2, 455/458, 456.5, 456.6, 67.11, 67.14, 560, 423, 436, 437, 439

(56) References Cited

U.S. PATENT DOCUMENTS

| 6,026,304 | A | | 2/2000 | Hilsenrath et al. | |
|---|---|---|---|---|---|
| 6,052,598 | A | * | 4/2000 | Rudrapatna et al. | ..... 455/456.1 |
| 6,064,885 | A | * | 5/2000 | Rouhollahzadeh et al. | . 455/439 |
| 6,104,931 | A | * | 8/2000 | Havinis et al. | .......... 455/456.5 |
| 6,138,003 | A | * | 10/2000 | Kingdon et al. | ............. 455/410 |
| 6,141,388 | A | * | 10/2000 | Servais et al. | ............... 375/262 |
| 6,167,274 | A | | 12/2000 | Smith | |
| 6,263,208 | B1 | | 7/2001 | Chang et al. | |
| 6,275,190 | B1 | * | 8/2001 | Sugiura et al. | ............. 342/464 |
| 6,275,705 | B1 | * | 8/2001 | Drane et al. | ............. 455/456.2 |
| 6,362,783 | B1 | * | 3/2002 | Sugiura et al. | ............. 342/457 |
| 6,385,454 | B1 | * | 5/2002 | Bahl et al. | .................. 455/450 |
| 6,434,364 | B1 | * | 8/2002 | O'Riordain | .............. 455/67.11 |
| 6,496,700 | B1 | * | 12/2002 | Chawla et al. | ........... 455/435.2 |

FOREIGN PATENT DOCUMENTS

| WO | WO 98 15149 A | 4/1998 |
|---|---|---|
| WO | WO 01 28272 A | 4/2001 |

* cited by examiner

*Primary Examiner*—Marceau Milord

(57) ABSTRACT

A system and method of estimating the position of a mobile terminal (MT) operating in a radio telecommunications network. Expected Received Signal Strength (RSS) values are predicted by a computer-aided prediction tool, and/or are measured by a test MT from base station transceivers. The predicted and measured RSS values are then tagged to indicate whether each value was predicted or measured. The RSS values are then stored at a plurality of locations in a database. When RSS measurements are received from the MT being located, a covariance matrix is used to compute metrics for the locations in the database. If more than a threshold percentage of the locations were populated with measured values, a Maximum-Likelihood (ML) estimator is used to estimate the position of the MT. If fewer than the threshold percentage of locations were populated with measured values, a Minimum-Mean-Square-Error (MMSE) estimator is used to estimate the position.

27 Claims, 2 Drawing Sheets

SYSTEM AND METHOD OF ESTIMATING THE POSITION OF A MOBILE TERMINAL IN A RADIO TELECOMMUNICATIONS NETWORK

BACKGROUND OF THE INVENTION

1. Technical Field of the Invention

This invention relates to telecommunication systems. More particularly, and not by way of limitation, the present invention is directed to a system and method of estimating the position of a mobile terminal in a radio telecommunications network.

2. Description of Related Art

In modern radio telecommunication systems, the service area is divided into cells, each of which is served by a base station transceiver. As mobile terminals move about the service area of the system, they are handed off from one cell to another so that there is no lapse in service. In times of emergency, it would be extremely useful to police or other emergency crews responding to the situation to have precise position information for the mobile terminal. For this reason, the Federal Communications Commission (FCC) has mandated that cellular carriers be able to locate the position of a mobile terminal operating in their service areas to within a few hundred feet when the mobile terminal makes an emergency 911 (E911) call. The FCC mandate requires the position of the 911 caller to be computed and passed on to an emergency network operator.

One solution being considered by carriers operating Time Division Multiple Access (TDMA) networks is to locate mobile terminals using Received Signal Strength (RSS) measurements for signals transmitted by base stations and received at the mobile terminal. Of course, RSS-based position location, once implemented, can also be used for commercial location-based services.

A major problem with existing solutions for locating mobile terminals is the high cost and complexity required for their implementation into the existing cellular network infrastructure. Some solutions require extensive modifications to base stations or other components of the cellular telecommunication system. Others require extensive modifications to mobile terminals and are inadequate due to the large number of unmodified mobile terminals already in service.

Position location systems in general require multiple measurements either by the mobile terminal whose position is being determined, or by a set of fixed transceivers (base stations). The measurements are made on signals sent between the base stations and the mobile terminal. The measurements may include time of arrival, angle of arrival, or the signal strength of the received signal. Combinations of all three types may be used as well.

In general, the computation of the mobile terminal's position involves minimizing some error criterion given a set of functions that define the dependence of the measurements on the true position of the mobile terminal. For example, in the case of time of arrival measurements, this function is the difference between the time of the transmission and the time of reception of the radio signal which is simply the distance between the base station and the mobile terminal divided by the speed of light. While such functions exist for the case of RSS measurements (for example, the Okumura-Hata formula), they typically vary significantly with terrain. Also, when characterized accurately for each location (rather than in a statistical sense for a whole area), the functions generally do not have a convenient closed form mathematical expression. This is due to the large variance in RSS caused by fixed objects around the mobile terminal in each specific location.

In order to overcome the disadvantage of existing solutions, it would be advantageous to have a system and method of determining the position of a mobile terminal in a radio telecommunications network that can operate in an environment with high location-specific anomalies with a high degree of accuracy. The present invention provides such a system and method.

SUMMARY OF THE INVENTION

In one aspect, the present invention is directed to a method of determining the position of a mobile terminal operating in the coverage area of a radio telecommunications network having a plurality of base station transceivers. The method begins by determining, for a plurality of positions throughout the coverage area of the network, expected Received Signal Strength (RSS) values of a signal transmitted by base station transceivers and received at a typical mobile terminal. Alternatively, the method may determine for a plurality of positions throughout the coverage area of the network, expected RSS values of a signal transmitted by the mobile terminal and received at the base station transceivers. The expected RSS values may be predicted values, or values measured from a test mobile terminal, or both. The expected RSS values are then stored at a plurality of locations in a database. If both predicted and measured values are stored, an indication is stored indicating whether each RSS value is predicted or measured.

After the database is populated, the system is ready to position mobile terminals in real-time. When a mobile terminal needs to be positioned, RSS measurements made by the mobile terminal on signals transmitted by the base stations are sent back to the cellular network. The RSS measurements obtained from the mobile terminal are compared with the expected RSS values stored in the database, and the position of the mobile terminal is then estimated based on differences between the RSS measurements and the expected RSS values.

In one embodiment, the RSS measurements obtained from the mobile terminal are compared with the expected RSS values stored in the database by first storing, for each sector of the database, a first expected measurement variance for all locations in the database that are populated with measured values, and storing a second expected measurement variance for all locations in the database that are populated with predicted values. The first expected measurement variance is used in comparing the RSS measurements with the expected RSS values, if the expected RSS values are measured values. If the expected RSS values are predicted values, the second expected measurement variance is used in the comparison.

The position estimation may be performed by first determining whether the percentage of locations in the database that are populated with measured values exceeds a predefined threshold. If so, a maximum-likelihood estimator may be utilized to estimate the position. If the percentage of locations in the database that are populated with measured values does not exceed the predefined threshold a minimum-mean-square-error estimator may be utilized to estimate the position.

In another aspect, the present invention is directed to a system for estimating the position of a mobile terminal operating in the coverage area of a radio telecommunications network. The system includes means for determining expected RSS values of signals transmitted by the base station transceivers and received by a typical mobile terminal, for a plurality of positions throughout the coverage area of the network; means for storing the expected RSS values at a plurality of locations in a database; and means for measuring at the mobile terminal for which the position is to be estimated, the RSS of signals transmitted by the base station transceivers in the network. The system also includes means for comparing the RSS measurements obtained by the mobile terminal with expected RSS values, and estimating the position of the mobile terminal based on differences between the RSS measurements and the expected RSS values.

In yet another aspect, the present invention is directed to a method of populating a database with expected RSS values for a typical mobile terminal operating in the coverage area of a radio telecommunications network. The method begins by determining, for a plurality of positions throughout the coverage area of the network, expected RSS values of a signal transmitted by the network's base station transceivers and received by the typical mobile terminal. This step may include the steps of predicting the expected RSS values for a first portion of the positions with a computer-aided prediction tool, and taking actual measurements of the RSS of signals transmitted by the base station transceivers and received by a test mobile terminal for a second portion of the positions. The predicted and measured expected RSS values are then stored at a plurality of locations in the database. The method may also include the step of tagging each location in the database to indicate whether the stored RSS value is a predicted value or a measured value.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
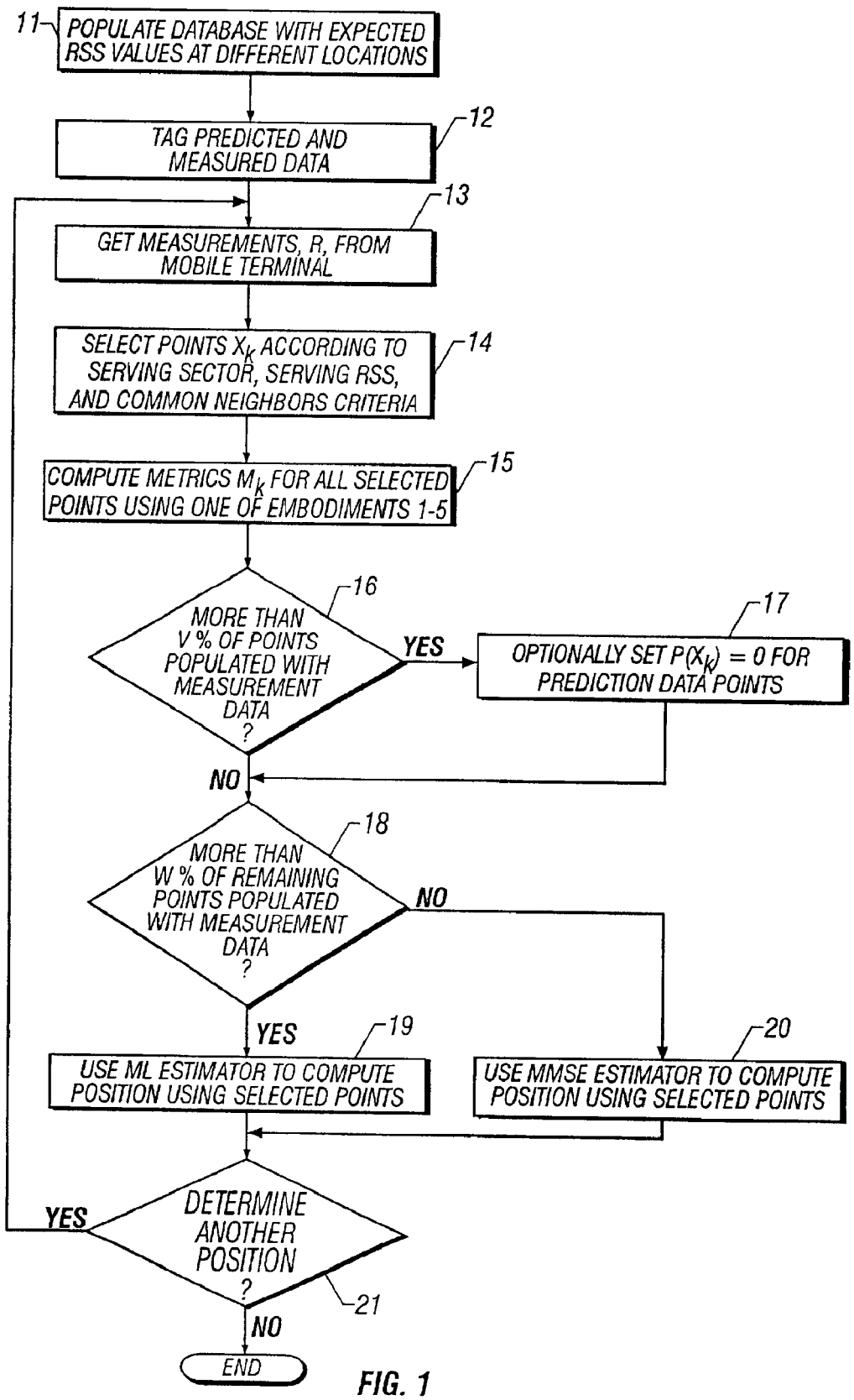
FIG. 1 is a flow chart illustrating one embodiment of the method of the present invention for populating a database with expected RSS values and computing the position of a mobile terminal.

The present invention is a method of estimating the position of a mobile terminal in a radio telecommunications network where location-specific characteristics at different locations cause large variations in RSS at these locations. As noted above, in each specific location, fixed objects around a mobile terminal may cause large variations in the measured RSS of signals from cooperating base stations. Hence, for RSS-based position location, the present invention implements a database that tabulates the expected RSS values at various locations within the coverage area. Once such a database is available, the position of a mobile terminal may be computed by comparing actual RSS measurements made by the mobile terminal to expected RSS values at different locations tabulated in the database, and then estimating the mobile terminal's position using an error minimization algorithm.

Two approaches may be used to populate the database. In the first approach, the expected RSS for various channels at a certain location, obtained using computer-aided prediction tools, may be used to populate the database. The prediction tools incorporate terrain and clutter data into their prediction model. While this approach is more accurate than using a simple expression such as the Okumura-Hata formula, an even more accurate approach may be utilized in some situations. This second approach is to measure the actual RSS at various points in the coverage area using, for example, a test mobile terminal. While performing measurements and using these measurements to populate the database provides the best accuracy for the database, there are obvious practical limitations to this approach. In practice, both prediction data and measurement data may be used in combination. For example, prediction data may be used to create the database, and measurement data may then be used to re-calibrate the database when measurements become available.

A Maximum-Likelihood (ML) estimation algorithm or the like may be utilized to estimate the position of the mobile terminal given a set of RSS measurements. However, when the quality of the data populating the database is not very good, as is the case when only prediction data is used to populate the database, a Minimum-Mean-Square-Error (MMSE) estimate is more robust. Also, parameters used in either the ML algorithm or the MMSE algorithm are different depending on what kind of data is used to populate the database. For example, one of the key parameters, measurement noise variance, is set lower when measurement data is used to populate the database and higher when prediction data is used instead. The situation may be further complicated when the database is a hybrid of both prediction and measurement data. The present invention provides techniques to efficiently compute the position of the mobile terminal while taking into account the nature of the data populating the database.

The database contains the expected received signal strengths, $f_i(x_k)$, for various locations, $x_k$, in the database. The location, x, is a vector given by x=(x, y), when x and y are the latitude and longitude of the mobile terminal, and $f_i(x)$ is the expected RSS for the $i^{th}$ sector. The term "sector" refers to the sector of the cellular antenna that transmits the signal to the mobile terminal. Typically, cellular base station transceivers and antennas are located at the center of the cell that they cover. The coverage area, and the cellular antenna, is typically divided into three 120° sectors. However, the number of sectors, and degrees of coverage, may vary based on the antenna deployment in the network. The position of the mobile terminal is computed by measuring the RSS from a number of such antenna sectors.

When the position of a mobile terminal is to be determined, a set of measurements $r_i(x) = f_i(x) + n_i$ where i=1, 2, ... N (where N is the number of sectors measured) are given to the Positioning Determining Equipment (PDE) which is the node in the network that computes the position of the mobile terminal. The quantity $n_i$ is the measurement noise and has a Gaussian probability distribution function when the RSS measurements are expressed in dB.

The PDE must estimate the unknown position, x, from the measurements, $r_i$. In order to do this the PDE computes a metric for each position, $x_k$, in the database and estimates the unknown position, x, based on these metrics. The metric, $m_k$, is the probability of obtaining RSS measurements, r, (when $r = r_1, r_2 \ldots r_n$) and the probability that the true position is $x_k$. The metric, $m_k$, is defined by the equation:

$$m_k = p(r|x_k) \cdot p(x_k)$$

where the quantity $p(r|x_k)$ is the probability that measurements, r, are received given that the position is $x_k$, and the quantity $p(x_k)$ is the apriori probability that the mobile terminal is at position $x_k$. The quantity $p(r|x_k)$ is dependent on the characteristics of the noise variable, $n_i$. Specifically, for RSS measurements, $p(r|x_k)$ is specified by a Gaussian probability distribution function that is defined by a covariance matrix, N. The element in row i and column k of the covariance matrix N is $E([n_i-E(n_i)]\cdot[n_k-E(n_k)])$, i.e., the expected value of the product of the noise variables minus their mean values. When i=k, this is the variance of the noise variable, $n_i$.

A covariance matrix for two random variables, x and y, takes the form:

$$\begin{vmatrix} E(x \cdot x) & E(x \cdot y) \\ E(y \cdot x) & E(y \cdot y) \end{vmatrix}$$

where $E(x \cdot x)$ is the expected value of x times x, $E(x \cdot y)$ is the expected value of x times y, and so on. The expected value $E(x \cdot x)$ is the sum (or integral) of $(p(x) \cdot x \cdot x)$ over all possible values of x, where $p(x)$ is the probability density function of x. In covariance matrices for real values, $E(x \cdot y)$ and $E(x \cdot y)$ are equal, and hence the matrices are symetric.

When the position, x, is estimated as the point in the database, $x_k$, that maximizes this metric, the estimate is a Maximum-Likelihood (ML) estimate. When the position, x, is estimated as $E(x_k|r)$, i.e., the expected value of the position, x, given the measurements, r, the estimate is a Minimum-Mean-Square-Error (MMSE) estimate. The quantity $E(x_k|r)$ can be computed as $\Sigma_k\{(m_k \cdot x_k)/\Sigma_k m_k\}$, i.e., as a function of the metrics, $m_k$, for all the points being considered in the database. Note that the contribution of any particular location, $x_k$, may be removed by setting the apriori probability $p(x_k)=0$. When an MMSE estimate is formed by setting the apriori probabilities for all points except the point with the highest metric, $m_k$, to zero, the computed position is the same as that for the ML estimate. When a few points that have the highest metrics are chosen, the estimate is not exactly the ML estimate, but is very similar in performance.

A whole range of estimators between the ML and MMSE estimators can be chosen by varying the number of points considered. When the quality of the measurements is poor and/or the measurements may have biases, the MMSE estimate is more robust and shows better performance in most regions of interest. However, when the measurement quality is good and biases are close to zero, the ML estimate exhibits better performance.

Marking of Entries in the Database

The database is essentially a set of sectors and RSS values for these sectors for each physical location in the coverage area of the cellular network. The database may be configured as a table in which each row contains the sectors and RSS values for a single location. A number of rows corresponding to different locations then form the table. In the present invention, each row is marked with a tag that indicates whether the data for that location was populated using prediction algorithms or actual measurements.

Use of Covariance Matrices in Metric Computation

In order to compute the position of the mobile terminal, certain entries are selected from the database based upon the identity of the serving sector, the serving RSS, and the number of common neighbors each database entry has with the set of measured sectors. The identity of the serving sector is used to limit the geographical area of the points considered. The measured RSS value in the serving sector is used to limit the points considered to those above a threshold derived from the measured RSS. Lastly, only points with more than a threshold number of common neighbors with the measured sectors are considered. Metrics are computed for these selected points, and the position is subsequently estimated.

As described earlier, the computation of the metrics requires a covariance matrix, N. Typically, the covariance matrix, N, is different when actual measurements are used instead of predicted values to populate the database. The diagonal elements of the matrix reflect the variance of the measurement errors obtained when measuring the RSS at the mobile terminal. The variances are expected to have lower values when actual measurements are used to populate the database. Performance improvements may also be obtained in some cases by using different covariance matrices for each location since the statistics of the errors in the measurements may be location dependent. Five different methodologies are described below for computing the metrics for each of the points in the database.

In a first embodiment of the present invention, a separate covariance matrix is stored for each database entry to compute the metrics for each of the locations in the database. When a metric has to be computed for a certain location, the covariance matrix for the corresponding entry is used by extracting the sub-matrix of the covariance matrix whose rows and columns correspond to the sectors that are common between the database entry and the sectors used for the measurement set, r. For example, if the stored covariance matrix is a 3×3 matrix for the sectors 1, 2 and 3, and the measurements were made on sectors 1 and 3, then, the sub-matrix contains the elements of the covariance matrix indexed by the pairs (2, 1), (3, 3), (1, 3) and (3, 1). This sub-matrix is then used in computing the value of $p(r|x_k)$ in order to compute the metric $m_k$.

In a second embodiment of the present invention, two covariance matrices are stored for the whole database to compute the metrics for each of the points in the database. One of the covariance matrices pertains to database entries with actual measurement data, and the other covariance matrix pertains to entries with prediction data. Each covariance matrix is larger than the separate covariance matrix that is stored for each database entry in the first embodiment described above. Each matrix contains rows corresponding to all of the sectors in the database. When the metric for a certain location corresponding to a certain database entry is to be determined, the same procedure as described in the first embodiment above may be used. The sub-matrix for the entry is extracted out of the larger covariance matrix that contains information for all the sectors. The covariance matrix is chosen based on the tag for the database entry indicating whether actual measurements or predictions were used to populate the database entry.

In a third embodiment of the present invention, the covariance matrix is assumed to be a diagonal matrix with different elements for each sector. If the non-diagonal elements, $x_{ij}$, $(i \neq j)$ of a square matrix are all zero, the matrix is a diagonal matrix. For example, the following matrix is a diagonal matrix:

$$\begin{vmatrix} E(x \cdot x) & 0 \\ 0 & E(y \cdot y) \end{vmatrix}$$

As can be seen from this example, there is only the need to store as many elements as there are variables. Thus, the storage size for the covariance matrix is reduced significantly.

For the present invention, the variables are the errors in the RSS for each of the sectors. Hence, instead of storing a matrix, a single variance value may be stored per sector per location. Assuming, as in the first embodiment above, that the variance is location dependent, a single value is stored for the expected measurement variance of each sector at each location or entry in the database. For example, if there are 20 sectors in the whole system, and 100 locations (grid points) in the area, a total of 2,000 values are stored.

In a fourth embodiment of the present invention, the covariance matrix is again assumed to be a diagonal matrix with different elements for each sector. It is assumed as in the second embodiment above, that the measurement variance is not location dependent, and therefore a single value is stored in the database for each sector, across all locations. For example, if there are 20 sectors in the whole system, and 100 locations in the area, only 20 values would be stored. Although the variance used is not specific to each location, different values may be stored for measurement and prediction data. The fourth embodiment has the lowest memory storage requirements of the embodiments discussed so far. The storage required for the fourth embodiment is much lower than that required for the third embodiment, just as the storage required for the second embodiment is lower than that required for the first embodiment. Also, the storage required for the third embodiment is lower than that for the first embodiment, and the storage required for the fourth embodiment is lower than that for the second embodiment.

In a fifth embodiment of the present invention, a single value is used for the variance of all sectors, i.e., it is assumed that the covariance matrix is diagonal with all elements of the diagonal being the same. However, it is assumed that the variance values are different for measurement data and prediction data. Hence, in this embodiment, only two values are stored for the measurement variance. One value is used when computing metrics for entries populated with actual measurement data, and the other value is used when computing metrics for entries populated with prediction data.

Dynamic Switching of Algorithms

The selection of the ML or MMSE algorithms may be dynamically switched based on the positions being considered. When the position for a mobile terminal has to be computed, a set of points is selected from the database. Metrics are then computed for these selected points. Then, an ML or an MMSE estimator or some other type of estimator is used to compute the position of the mobile terminal based on these selected points and computed metrics. As discussed above, the criteria used for performing the initial selection of points may include the identity of the serving sector, the measured RSS of the serving sector, and the number of common neighbors each database entry has with the set of measured sectors.

In the present invention, two different techniques may be utilized, either separately or simultaneously in combination, to optimize positioning performance depending on the set of locations that are selected from the database. A first percentage parameter, V, may be set to a relatively high value such as 80 or 90 percent. When more than "V" percent of the locations or database entries selected from the database have been populated using actual measurement data, the other selected points (those with prediction data) are not used, i.e., $p(x_k)$ is set to zero for the other points. A second threshold, W, may be set to a lower value. When more than "W" percent of the locations or database entries selected from the database have been populated using actual measurement data, the ML estimator is used. If fewer than "W" percent of the locations or database entries selected from the database have been populated using actual measurement data, the MMSE estimator is used.

FIG. 1 is a flow chart illustrating one embodiment of the method of the present invention for populating the signal strength database with expected RSS values and computing the position of a mobile terminal. At step 11, the database is populated with expected RSS values at different locations throughout the coverage area of the cellular network. The expected RSS values for various channels at each location may be obtained using computer-aided prediction tools. Alternatively, the actual RSS values at various points in the coverage area may be measured and reported using, for example, a test mobile terminal. A combination of predicted and measured data may also be used. At step 12, each row in the database is marked with a tag that indicates whether the data for that location was populated using a prediction algorithm or using actual measurements. Once the database is set up, the positioning procedure shown in the remainder of FIG. 1 may be followed for mobile terminals throughout the network coverage area.

At step 13, a set of measurements, r, taken by the mobile terminal being located are sent to the PDE for computing the position of the mobile terminal. At step 14, the PDE selects locations $x_k$ from the database using the serving sector, serving RSS, and common neighbor criteria. At step 15, the PDE uses one or more covariance matrices to compute metrics, $m_k$, for all of the selected points. The type of matrix utilized may vary depending on whether the RSS data is predicted or measured, as described in the five embodiments above. At step 16, it is determined whether more than "V" percent of the database entries selected from the database were populated using actual measurement data. The parameter, V, is a predefined percentage parameter that may be set to a relatively high value such as 80 or 90 percent. If more than V percent of the selected database entries were populated using actual measurement data, the process moves to step 17 where the selected entries populated with prediction data are not used, i.e., $p(x_k)$ is set to zero for those entries. The process then moves to step 18.

If it is determined at step 16 that less than "V" percent of the selected database entries were populated using actual measurement data, the process moves to step 18 where it is determined whether more than "W" percent of the remaining database entries selected from the database were populated using actual measurement data. The parameter, W, is a predefined percentage parameter that may be set to a value lower than the value of parameter, V. For example, W may be set to a value of 60–70 percent. If more than W percent of the selected database entries were populated using actual measurement data, the process moves to step 19 where the ML estimator is used to compute the position of the mobile terminal using the selected data points. However, if fewer than W percent of the selected database entries were populated using actual measurement data, the MMSE estimator provides a more robust solution. Therefore, the process moves to step 20 where the MMSE estimator is used to compute the position of the mobile terminal using the selected data points.

Once the position of the mobile terminal has been determined, the process moves to step 21 where it is determined whether or not the position of additional mobile terminals needs to be determined. In practice, the process may wait until there is a mobile terminal that needs to be located, and the process then returns to step 13 where a set of measurements, r, taken by the next mobile terminal to be located are sent to the PDE for computing the position of the mobile terminal. If there are no mobile terminals to be located at step 21, the process ends.

Figure 2:
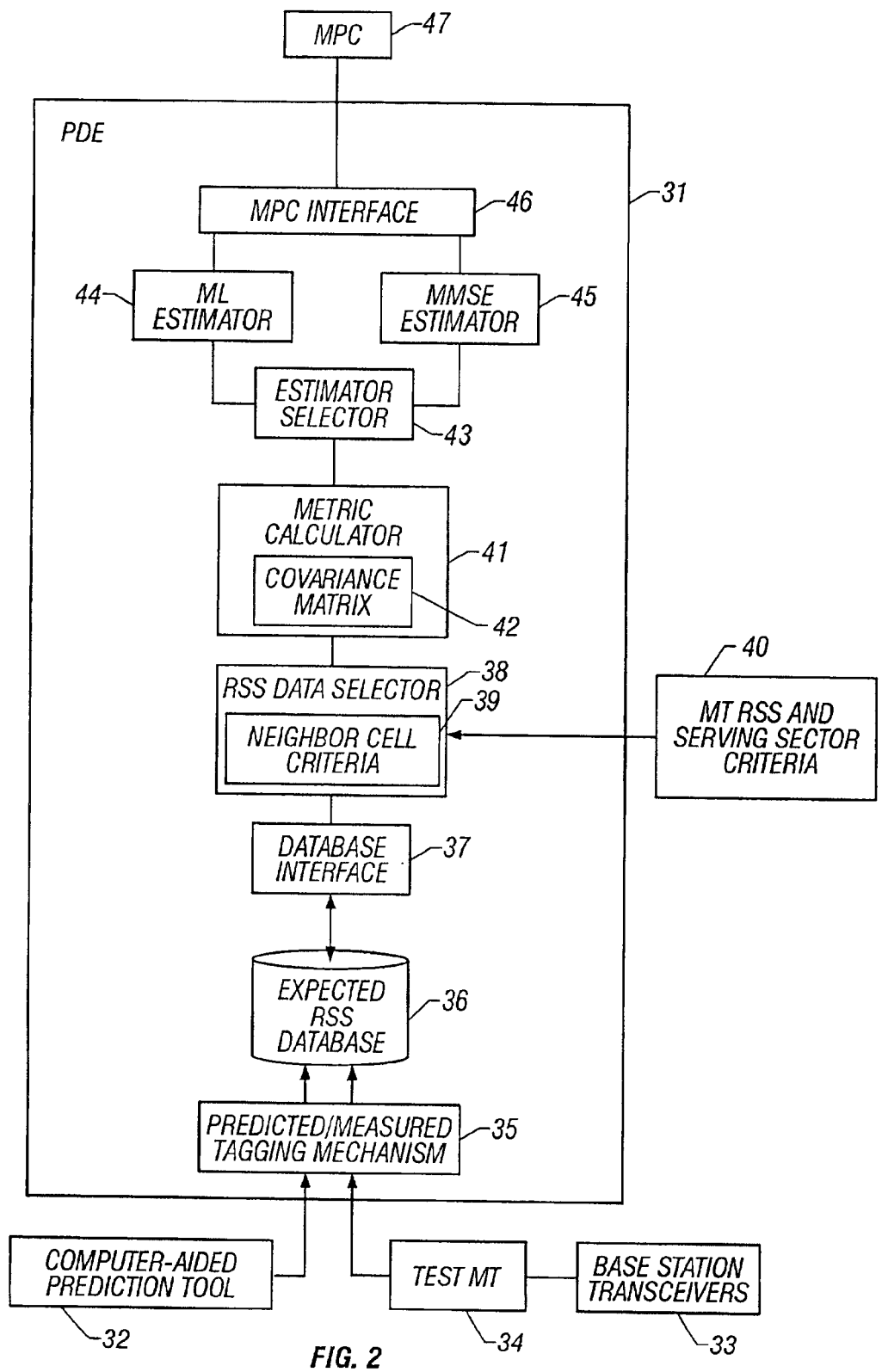
FIG. 2 is a simplified functional block diagram of an embodiment of the system of the present invention, including a modified Position Determining Equipment (PDE).

FIG. 2 is a simplified functional block diagram of an embodiment of the system of the present invention, including a modified Position Determining Equipment (PDE) 31.

Predicted RSS values are determined by a Computer-Aided Prediction Tool 32. A Test Mobile Terminal (MT) 34 takes actual measurements of RSS from Base Station Transceivers 33. The predicted RSS values and the actual measurements of RSS are then tagged by a Predicted/Measured Tagging Mechanism 35 to indicate whether each value was predicted or measured. The expected RSS values are then stored in an Expected RSS Database 36. The database may store predicted RSS values, actual RSS measurements, or both. A Database Interface 37 is used to provide the expected RSS values to an RSS Data Selector 38 which selects locations from the database based upon the number of common neighbor cells 39 neighboring the MT's serving sector, and criteria 40 received from the MT's serving Mobile Switching Center (MSC) such as the RSS measured by the MT being located and the MT's serving sector.

A Metric Calculator 41 uses a Covariance Matrix 42 to compute metrics for the selected RSS values. An Estimator Selector 43 then determines the percentage of selected RSS values that were measured, and if more than a threshold percentage were measured, the selector sends the metrics to a Maximum-Likelihood (ML) Estimation Algorithm 44 to estimate the position of the mobile terminal. If the selector determines that fewer than the threshold percentage of selected RSS values were measured, the selector sends the metrics to a Minimum-Mean-square-Error (MMSE) Estimation Algorithm 45 to estimate the position of the mobile terminal. Once a position is determined, the PDE sends the position information to a Mobile Positioning Center (MPC) 47 through an MPC Interface 46. The MPC typically controls a plurality of PDEs within the network for determining the position of mobile terminals throughout the network.

It is thus believed that the operation and construction of the present invention will be apparent from the foregoing description. While the method, apparatus and system shown and described has been characterized as being preferred, it will be readily apparent that various changes and modifications could be made therein without departing from the scope of the invention as defined in the following claims.

What is claimed is:

1. A method of estimating a position of a mobile terminal operating in a coverage area of a radio telecommunications network having a plurality of base station transceivers and a plurality of service area sectors, said method comprising the steps of:

determining, for a plurality of positions throughout the coverage area of the network, expected Received Signal Strength (RSS) values of a signal transmitted by the base station transceivers and received by a typical mobile terminal;

storing the expected RSS values at a plurality of locations in a database;

obtaining, by the mobile terminal for which the position is to be estimated, RSS measurements of signals transmitted by the base station transceivers;

comparing the RSS measurements obtained from the mobile terminal with the expected RSS values stored in the database; and estimating the position of the mobile terminal based on differences between the RSS measurements and the expected RSS values.

2. The method of estimating a position of a mobile terminal of claim 1 wherein the step of determining expected RSS values for a plurality of positions throughout the coverage area of the network includes predicting the expected RSS values with a computer-aided prediction tool.

3. The method of estimating a position of a mobile terminal of claim 2 wherein the step of predicting the expected RSS values with a computer-aided prediction tool includes predicting the expected RSS values with a computer-aided prediction model that considers the effect of terrain and clutter on the expected RSS values.

4. The method of estimating a position of a mobile terminal of claim 1 wherein the step of determining expected RSS values for a plurality of positions throughout the coverage area of the network includes taking a plurality of actual measurements of the RSS of signals transmitted by the base station transceivers and received by a test mobile terminal.

5. The method of estimating a position of a mobile terminal of claim 1 wherein the step of determining expected RSS values for a plurality of positions throughout the coverage area of the network includes taking a plurality of actual measurements of the RSS of a signal transmitted by a test mobile terminal and received by the base station transceivers.

6. The method of estimating a position of a mobile terminal of claim 1 wherein the step of determining expected RSS values for a plurality of positions throughout the coverage area of the network includes the steps of:

predicting the expected RSS values for a first portion of the positions with a computer-aided prediction tool; and taking actual measurements of the RSS of signals transmitted by the base station transceivers and received by a test mobile terminal for a second portion of the positions.

7. The method of estimating a position of a mobile terminal of claim 6 wherein the step of storing the expected RSS values in a database includes storing an indicator for each value indicating whether each stored value is a predicted value or a measured value.

8. The method of estimating a position of a mobile terminal of claim 7 wherein the step of comparing the RSS measurements obtained from the mobile terminal with the expected RSS values stored in the database includes the steps of:

associating a covariance matrix with each of the locations in the database;

extracting a sub-matrix of the covariance matrix whose columns and rows correspond to sectors that are common between the sectors stored for the locations in the database and the sectors for which the RSS measurements were obtained from the mobile terminal;

calculating, for each location in the database, a probability that RSS measurements are obtained, given that the mobile terminal is at that location; and computing metrics for each location in the database utilizing the calculated probability and a second probability that the mobile terminal is located at the corresponding position.

9. The method of estimating a position of a mobile terminal of claim 7 wherein the step of comparing the RSS measurements obtained from the mobile terminal with the expected RSS values stored in the database includes the steps of:

associating a first covariance matrix with each of the locations in the database that are populated with measured values, said first matrix containing rows corresponding to all sectors for which measurements are stored in the database for that location;

associating a second covariance matrix with each of the locations in the database that are populated with predicted values, said second matrix containing rows corresponding to all sectors for which measurements are stored in the database for that location;

determining from the stored indicator, whether the location in the database was populated with a measured value or a predicted value;

selecting the first covariance matrix if the location was populated with a measured value;

selecting the second covariance matrix if the location was populated with a predicted value;

extracting a sub-matrix of the selected covariance matrix whose columns and rows correspond to sectors that are common between the sectors stored for a location in the database and the sectors from which the RSS measurements were obtained from the mobile terminal;

calculating, for each location in the database, a probability that RSS measurements are obtained, given that the mobile terminal is at that location; and computing metrics for each location in the database utilizing the calculated probability and a second probability that the mobile terminal is located at the corresponding position.

10. The method of estimating a position of a mobile terminal of claim 7 wherein the step of storing the expected RSS values at a plurality of locations in the database includes storing, for each location in the database, an expected measurement variance for each service sector; and the step of comparing the RSS measurements obtained from the mobile terminal with the expected RSS values stored in the database includes the steps of:

weighting the RSS measurements obtained from the mobile terminal with the expected measurement variance for the mobile terminal's service sector; and comparing the weighted RSS measurements with the expected RSS values stored in the database.

11. The method of estimating a position of a mobile terminal of claim 7 wherein the step of storing the expected RSS values at a plurality of locations in the database includes the steps of:

storing in the database for each service sector, a first expected measurement variance for all locations in the database that are populated with measured values; and storing in the database for each service sector, a second expected measurement variance for all locations in the database that are populated with predicted values.

12. The method of estimating a position of a mobile terminal of claim 11 wherein the step of comparing the RSS measurements obtained from the mobile terminal with the expected RSS values stored in the database includes the steps of:

weighting the RSS measurements obtained from the mobile terminal with the first expected measurement variance if the locations in the database being used for the comparing step are populated with measured values;

weighting the RSS measurements obtained from the mobile terminal with the second expected measurement variance if the locations in the database being used for the comparing step are populated with predicted values; and comparing the weighted RSS measurements with the expected RSS values stored in the database.

13. The method of estimating a position of a mobile terminal of claim 7 wherein the step of storing the expected RSS values at a plurality of locations in the database includes the steps of:

storing, for the entire database, a first expected measurement variance for all locations in the database that are populated with measured values; and storing, for the entire database, a second expected measurement variance for all locations in the database that are populated with predicted values.

14. The method of estimating a position of a mobile terminal of claim 13 wherein the step of comparing the RSS measurements obtained from the mobile terminal with the expected RSS values stored in the database includes the steps of:

weighting the RSS measurements obtained from the mobile terminal with the first expected measurement variance for locations in the database that are populated with measured values;

weighting the RSS measurements obtained from the mobile terminal with the second expected measurement variance for locations in the database that are populated with predicted values; and comparing the weighted RSS measurements with the expected RSS values stored in the database.

15. The method of estimating a position of a mobile terminal of claim 7 wherein the step of estimating the position of the mobile terminal based on differences between the RSS measurements and the expected RSS values includes the steps of:

determining whether the percentage of locations in the database being considered as candidates for the location of the mobile terminal that are populated with actual measurements exceeds a predefined threshold; and upon determining that the percentage of locations populated with actual measurements exceeds the predefined threshold:

discarding the RSS values that are predicted values; and utilizing an estimator based on a maximum-likelihood criterion to estimate the position.

16. The method of estimating a position of a mobile terminal of claim 7 wherein the step of estimating the position of the mobile terminal based on differences between the RSS measurements and the expected RSS values includes the steps of:

determining whether the percentage of locations in the database being considered as candidates for the location of the mobile terminal that are populated with actual measurements exceeds a predefined threshold;

utilizing an estimator based on a maximum-likelihood criterion to estimate the position, upon determining that the percentage of locations populated with actual measurements exceeds the predefined threshold; and utilizing an estimator based on a minimum-mean-square-error criterion to estimate the position, upon determining that the percentage of locations populated with actual measurements does not exceed the predefined threshold.

17. The method of estimating a position of a mobile terminal of claim 7 wherein the step of estimating the position of the mobile terminal based on differences between the RSS measurements and the expected RSS values includes the steps of:

determining whether the percentage of locations in the database that are populated with actual measurements exceeds a first predefined threshold;

upon determining that the percentage of locations populated with actual measurements exceeds the first predefined threshold:

discarding the RSS values that are predicted values; and utilizing an estimator based on a maximum-likelihood criterion to estimate the position;

upon determining that the percentage of locations populated with actual measurements does not exceed the first predefined threshold:

determining whether the percentage of locations populated with actual measurements exceeds a second predefined threshold that is lower than the first threshold;

utilizing the estimator based on the maximum-likelihood criterion to estimate the position, upon determining that the percentage of locations populated with actual measurements exceeds the second predefined threshold; and utilizing an estimator based on a minimum-mean-square-error criterion to estimate the position, upon determining that the percentage of locations populated with actual measurements does not exceed the second predefined threshold.

18. The method of estimating a position of a mobile terminal of claim 1 further comprising, prior to comparing the RSS measurements obtained from the mobile terminal with the expected RSS values stored in the database, the step of selecting particular expected RSS values for particular locations in the database based on the mobile terminal's serving sector, and wherein the step of comparing the RSS measurements includes comparing the RSS measurements obtained from the mobile terminal with the particular expected RSS values selected from the database.

19. The method of estimating a position of a mobile terminal of claim 18 wherein the step of selecting particular expected RSS values for particular locations in the database based on the mobile terminal's serving sector also includes selecting particular expected RSS values based on the RSS received at the mobile terminal from the mobile terminal's serving base station transceiver, and based on the number of base station transceivers neighboring the serving sector.

20. A method of estimating a position of a mobile terminal operating in a coverage area of a radio telecommunications network having a plurality of base station transceivers and a plurality of service sectors, said method comprising the steps of:

determining, for a plurality of positions throughout the coverage area of the network, expected Received Signal Strength (RSS) values of a signal transmitted by the base station transceivers and received by a typical mobile terminal, said determining step comprising:

predicting the expected RSS values for a first portion of the positions with a computer-aided prediction tool; and taking actual measurements of the RSS of signals transmitted by the base station transceivers and received by a test mobile terminal for a second portion of the positions;

storing the expected RSS values at a plurality of locations in a database with an indicator for each location indicating whether each stored value is a predicted value or a measured value, said storing step including:

storing in the database, for each service sector, a first expected measurement variance for all locations in the database that are populated with measured values; and storing in the database, for each service sector, a second expected measurement variance for all locations in the database that are populated with predicted values;

obtaining, by the mobile terminal for which the position is to be estimated, RSS measurements of signals transmitted by the base station transceivers;

weighting the RSS measurements obtained by the mobile terminal with the first expected measurement variance for locations in the database that are populated with measured values;

weighting the RSS measurements obtained by the mobile terminal with the second expected measurement variance for locations in the database that are populated with predicted values; and comparing the weighted RSS measurements with the expected RSS values stored in the database;

estimating the position of the mobile terminal based on differences between the weighted RSS measurements and the expected RSS values, said estimating step comprising:

determining whether the percentage of locations being considered in the database that are populated with measured values exceeds a predefined threshold;

utilizing an estimator based on a maximum-likelihood criterion to estimate the position, upon determining that the percentage of locations being considered in the database that are populated with measured values exceeds the predefined threshold; and utilizing an estimator based on a minimum-mean-square-error criterion to estimate the position, upon determining that the percentage of locations being considered in the database that are populated with measured values does not exceed the predefined threshold.

21. A system for estimating a position of a mobile terminal operating in a coverage area of a radio telecommunications network having a plurality of base station transceivers and a plurality of service sectors, said system comprising:

means for determining expected Received Signal Strength (RSS) values of signals transmitted by the base station transceivers and received by a typical mobile terminal for a plurality of positions throughout the coverage area of the network;

means for storing the expected RSS values at a plurality of locations in a database;

means for measuring by the mobile terminal for which the position is to be estimated, the RSS of signals transmitted by the base station transceivers; and means for comparing the RSS measurements obtained by the mobile terminal with expected RSS values, and estimating the position of the mobile terminal based on differences between the RSS measurements and the expected RSS values.

22. The system for estimating the position of a mobile terminal of claim 21 wherein the means for determining expected RSS values includes:

a computer-aided prediction tool that predicts the expected RSS values for a first portion of the positions; and a test mobile terminal that measures the RSS of test signals received from the base station transceivers for a second portion of the positions.

23. The system for estimating a position of a mobile terminal of claim 22 wherein the means for comparing the RSS measurements obtained by the mobile terminal with expected RSS values, and estimating the position of the mobile terminal is a positioning algorithm that includes:

means for computing a metric for each location in the database; and means for estimating the position of the mobile terminal using the computed metrics and apriori probabilities for each position.

24. The system for estimating a position of a mobile terminal of claim 23 wherein the means for computing a metric for each location in the database includes means for computing a different metric for each location, depending upon whether the location is populated with a predicted value or a measured value from the test mobile terminal.

25. The system for estimating a position of a mobile terminal of claim 24 wherein the means for estimating the position of the mobile terminal using the computed metrics and the apriori probabilities for each location includes:

an estimator based on a maximum-likelihood criterion;

an estimator based on a minimum-mean-square-error criterion; and means for selecting the estimator based on the maximum-likelihood criterion if the percentage of locations in the database that are populated with actual measurements exceeds a predefined threshold, or for selecting the estimator based on the minimum-mean-square-error criterion if the percentage of locations in the database that are populated with actual measurements does not exceed the predefined threshold.

26. A method of populating a database with expected Received Signal Strength (RSS) values for a typical mobile terminal operating in a coverage area of a radio telecommunications network having a plurality of base station transceivers that transmit radio signals received by the mobile terminal, said method comprising the steps of:

determining, for a plurality of positions throughout the coverage area of the network, expected RSS values of a signal transmitted by the base station transceivers and received by the typical mobile terminal, said determining step comprising the steps of:

predicting the expected RSS values for a first portion of the positions with a computer-aided prediction tool; and taking actual measurements of the RSS of signals transmitted by the base station transceivers and received by a test mobile terminal for a second portion of the positions; and storing the predicted and measured expected RSS values at a plurality of locations in the database.

27. The method of populating a database of claim 26 further comprising tagging each location in the database to indicate whether the stored RSS value is a predicted value or a measured value.

* * * * *